(12) United States Patent
Strauss

(10) Patent No.: US 7,597,306 B2
(45) Date of Patent: Oct. 6, 2009

(54) DIRECTIONAL CONTROL SEAT VALVE

(75) Inventor: Klemens Strauss, Frammersbach (DE)

(73) Assignee: Bosch Rexroth AG, Stuttgart (DE)

( * ) Notice: Subject to any disclaimer, the term of this patent is extended or adjusted under 35 U.S.C. 154(b) by 446 days.

(21) Appl. No.: 11/252,748

(22) Filed: Oct. 19, 2005

(65) Prior Publication Data
US 2006/0086915 A1 Apr. 27, 2006

(30) Foreign Application Priority Data
Oct. 22, 2004 (DE) .................. 10 2004 051 575

(51) Int. Cl.
*F16K 11/02* (2006.01)
(52) U.S. Cl. ...................... 251/282; 251/325
(58) Field of Classification Search ................ 251/325, 251/282, 344, 129.15, 281
See application file for complete search history.

(56) References Cited

U.S. PATENT DOCUMENTS

| | | | | |
|---|---|---|---|---|
| 2,601,989 A * | 7/1952 | Modes | ..................... | 137/625.4 |
| 4,360,036 A * | 11/1982 | Shelton | ..................... | 137/61 |
| 4,548,383 A * | 10/1985 | Wolfges | ..................... | 251/29 |
| 6,089,255 A * | 7/2000 | Bonnefous et al. | ..................... | 137/312 |
| 6,315,268 B1 * | 11/2001 | Cornea et al. | ..................... | 251/129.15 |
| 6,676,108 B1 * | 1/2004 | Weh et al. | ..................... | 251/282 |
| 6,688,334 B2 * | 2/2004 | Kawamura et al. | ..................... | 137/625.65 |
| 6,863,255 B2 * | 3/2005 | Watanabe et al. | ..................... | 251/129.21 |
| 6,918,409 B1 * | 7/2005 | Parker | ..................... | 137/614.11 |
| 6,935,616 B2 * | 8/2005 | Baumann | ..................... | 251/282 |
| 2005/0098755 A1* | 5/2005 | Kussel | ..................... | 251/324 |
| 2006/0289073 A1* | 12/2006 | Biener | ..................... | 137/630.13 |

FOREIGN PATENT DOCUMENTS

DE 91 09 976.5 U1 11/1991
DE 195 09 145 A1 9/1996

* cited by examiner

*Primary Examiner*—John Bastianelli
(74) *Attorney, Agent, or Firm*—Oliff & Berridge, PLC

(57) ABSTRACT

A directional control seat valve includes a piston that is biased against a valve seat by means of a spring. The piston is associated with a compensating piston whose end face subjected to the pressure at one of the ports of the directional control valve is arranged before the valve seat when viewed in the closing direction.

13 Claims, 2 Drawing Sheets

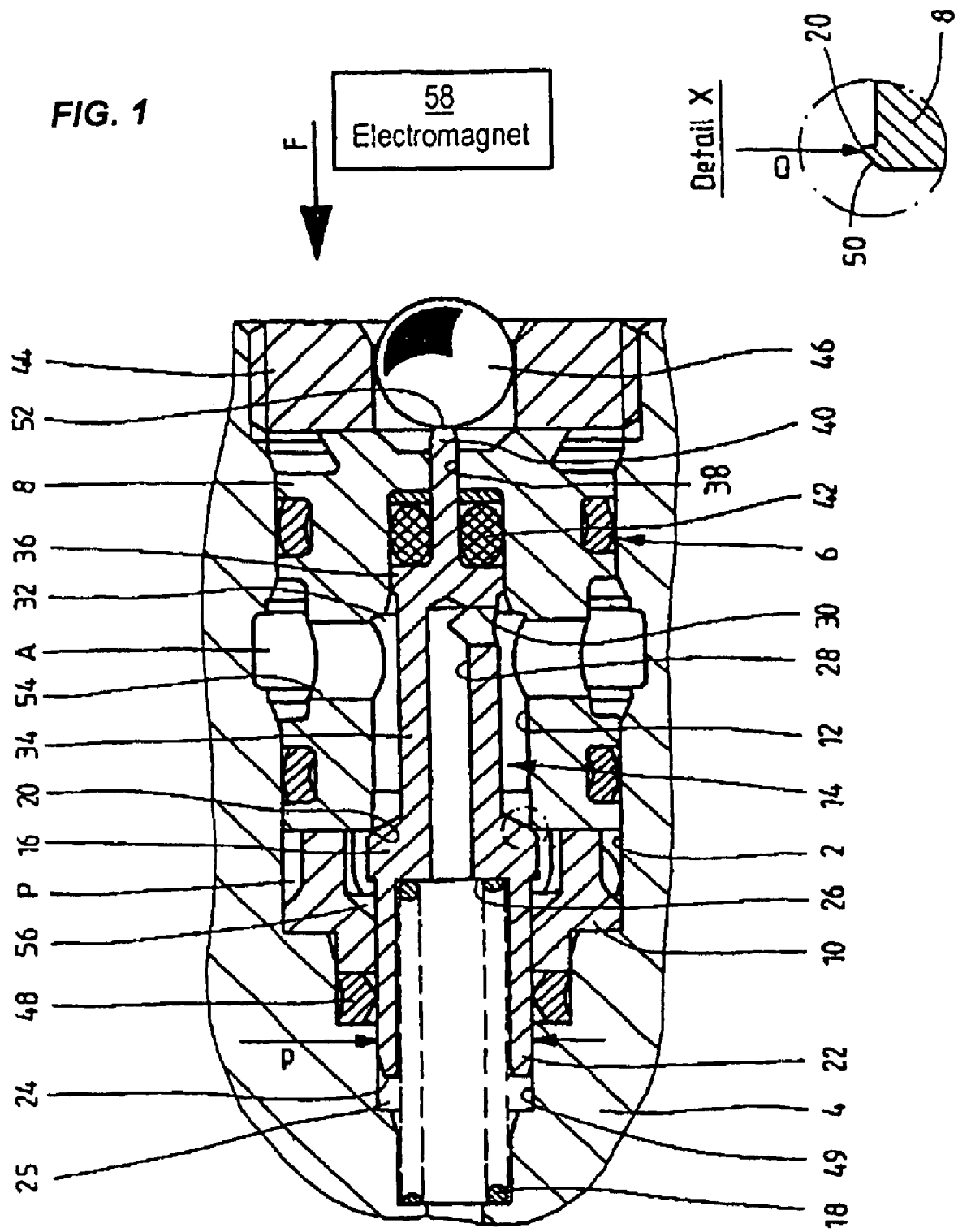

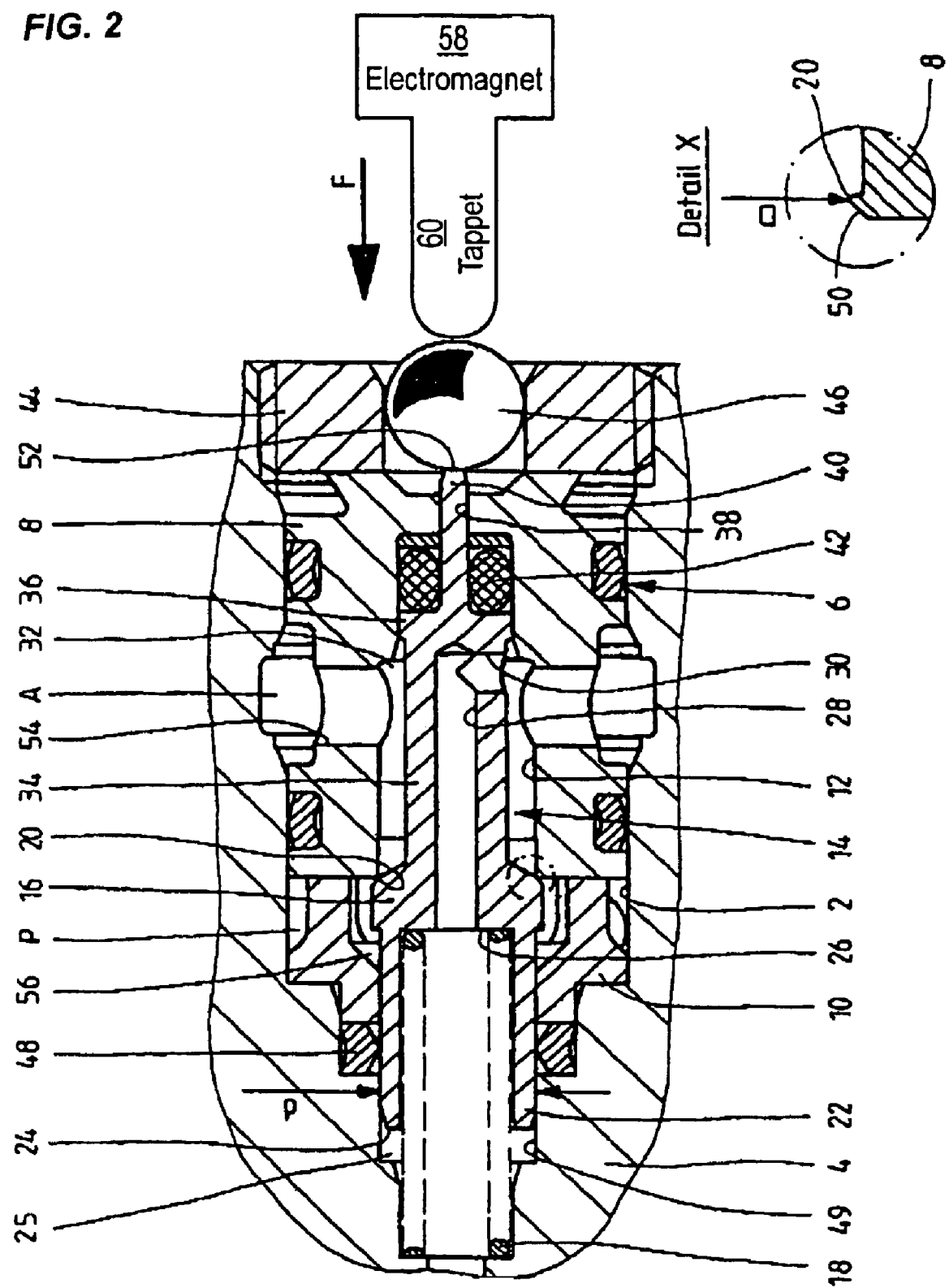

DIRECTIONAL CONTROL SEAT VALVE

BACKGROUND

The exemplary embodiments are directed to directional control seat valves.

In DE utility model G 91 09 976 a 4/2-way directional control seat valve is disclosed which is formed by two 2/2-way directional control seat valves each adapted to be actuated by means of a magnet. Each 2/2-way directional control seat valve comprises a valve cone which is biased against a valve seat by a spring. By means of the valve cone it is possible to open the connection between an inlet port and an outlet port. The known seat valve is executed so as to be pressure-balanced relative to one of the ports. To this end a compensating piston is formed on a piston carrying the valve cone, the rear-side end face removed from the valve seat of which is subjected to the pressure at one of the ports via a compensating passage, so that the piston is pressure-balanced relative to this port. In the known solution the compensating piston is executed integrally with the piston carrying the valve cone. In order to be able to introduce this piston into a valve bore, the diameter of the compensating piston must be selected somewhat smaller than the valve seat diameter. Moreover a play is required in order to ensure mobility of the compensating piston in the valve bore. Owing to the differential area between the diameter of the compensating piston and the valve seat diameter, the piston is acted on in the closing direction or in the opening direction in accordance with the one port at which the high pressure is present, so that correspondingly the spring acting on the valve cone in the closing direction must be designed to be comparatively strong, and an elevated actuation force must be furnished by the magnet whereby the directional control seat valve is taken into an open position.

In order to improve the sealing property, the valve seat is pre-pressed. Such pre-pressing is described, e.g., in DE 195 09 145 A1. During pre-pressing the valve seat diameter is reduced in accordance with the pressing width, so that the valve seat then has an accordingly smaller diameter—correspondingly the original valve seat diameter (prior to pressing) must be selected somewhat greater.

If, now, the valve seat is pre-pressed in the solution known from G 91 09 976, the external diameter of the compensating piston must be selected to be correspondingly smaller than the pre-pressed valve seat diameter. If a higher pressure is present at the one port that is connected via the compensating bore with the pressure chamber delimited by the end face of the compensating piston, a force effective in the closing direction acts on the piston owing to this differential area, whereas owing to the differential area the piston is acted on in the opening direction when the other port is subjected to pressure. Correspondingly the spring biasing the closure cone in the closing direction must be designed to be stronger in order to compensate for this differential area. The electromagnet must be designed so as to be able to shift the piston in the opening direction against the pressure forces and the comparatively high spring force.

SUMMARY

It is therefore necessary to provide a correspondingly large-size magnet or, in turn, to accept a restriction of the hydraulic performances.

In contrast, the exemplary embodiments are based on furnishing a directional control seat valve where the actuation force is reduced.

This object is attained by a directional control seat valve having the features described below and other features within the scope and spirit of the disclosure.

In accordance with the invention, the directional control seat valve is designed with a piston biased against a valve seat, whereby an inlet port may be connected with an outlet port. To the piston a compensating piston is associated, the end face of which when viewed in the closing direction is arranged in front of the valve seat—and not after the valve seat like in the prior art described at the outset. In other words, the end face of the compensating piston and the range of the piston contacting the valve seat are arranged on a same side relative to the valve seat. In the solution in accordance with the invention, the piston is thus acted on in the closing direction through the intermediary of the end face, wherein the arrangement of the compensating piston on this side valve seat allows to adapt its external diameter to the valve seat, such that the differential area described at the outset approaches zero or is equal to zero. In the above described solution this was not possible inasmuch as during assembly the compensating piston was generally inserted through the valve seat and thus had to have a smaller diameter than the valve seat.

In the embodiment in accordance with the invention it is preferred if the valve seat is pre-pressed, wherein the reduction of the valve seat diameter brought about by such pressing is compensated in a simple manner by a suitable design of the diameter of the compensating piston.

In an advantageous embodiment of the invention, the compensating piston and the piston carrying the valve cone are executed integrally. Here the piston is penetrated by a compensating passage which opens into the end face of the compensating piston and whereby the pressure at one of the ports is conducted into the pressure chamber delimited by the end face.

This pressure chamber is in a preferred embodiment a spring chamber for the spring biasing the piston in the closing direction.

In an embodiment exhibiting a particularly simple design, the piston includes an actuation projection on which a tappet of an electromagnet attacks indirectly or directly.

In one specific embodiment, the diameter of the end face of the compensating piston is designed to be smaller than the valve seat diameter and smaller than the diameter of the piston in the range of the valve seat.

The directional control seat valve preferably has the form of a 2/2-way directional control seat valve, wherein both ports may open in the radial direction into a valve bore receiving the piston.

In one embodiment, a seal attacks at the outer periphery of the compensating piston in the range between the end face and the valve seat.

Further advantageous developments of the invention are subject matter of further subclaims.

BRIEF DESCRIPTION OF THE DRAWINGS

FIG. 1 is a diagram of an embodiment showing a longitudinal sectional view of a directional control valve seat; and FIG. 2 is a diagram of an embodiment showing a longitudinal sectional view of a directional control valve seat, also showing the tappet of the electromagnet.

DETAILED DESCRIPTION OF EMBODIMENTS

The following embodiment of the invention is explained by referring to a single FIGURE showing a longitudinal sectional view of a 2/2-way directional control seat valve in accordance with the invention.

The valve is executed in cartridge design and inserted into a valve disc or valve block, so that it is possible to execute a 4/3-way directional control seat valve by combining, e.g., four such 2/2-way directional control seat valves. The 2/2-way directional control seat valve 1—hereinafter referred to as the seat valve—includes a cartridge-type housing 6 inserted in a reception bore 2 of valve disc 4 and being composed of a sleeve 8 and a housing part 10 in the represented embodiment. Inside the housing 6 a valve bore 12 is formed in which a piston 14 is guided in an axially displaceable manner. This piston has a valve cone 16 biased against a valve seat 20 by means of a spring 18.

A radial inlet or pressure port P is formed in the range of the housing part 10, and an outlet port A is formed at the sleeve 8, which ports are hydraulically connected with corresponding passages of the valve disc 4.

Via a star configuration of bores not represented here, the inlet port P is connected with an inlet pressure chamber 56 which is connected with the annular chamber 32 in the raised condition of the valve cone 16.

In the range of port A, the jacket of the sleeve 8 is recessed by a star configuration of bores 54 whereby port A is connected with the annular chamber 32.

The left-hand end portion of the piston 14 in the representation of the FIGURE forms a compensating piston 22, the stepped end face 24 of which defines a spring chamber 25 for the spring 18 that is supported on an end side of the reception bore 2 and attacks with its right-hand end portion at an internal shoulder 26 of the piston 14. This internal shoulder 26 is formed by the radially expanding part of a compensating passage 28 which opens on the one side into the end face 24, wherein a radially expanded part receives the end portion of the spring 18, and which opens on the other hand via a radial passage 30 into a annular chamber 32 that is delimited by a radially set-back center portion 34 of the piston following on the right side of the valve cone 16 in the representation.

Guidance of the compensating piston 22 is effected with the aid of a guide portion 49 of the reception bore.

Following the center portion 34, the right-hand end portion of the piston 14 in the view of the figure is radially expanded into a collar 36. On the end face of the collar 36 an axially protruding actuation projection 40 is formed which has a substantially smaller diameter than the collar 36 and which protrudes from the sleeve 8 on the end face side through a guide bore 38. In the guide bore 38 the piston 14 is thus guided at a small diameter. Sealing against the outside is effected with the aid of an O-ring seal 42 surrounding the actuation projection 40 and inserted in the valve bore 12. The collar 36 ensures that the O-ring 42 cannot migrate into a gap between the piston 14 and the sleeve 8.

The stepped housing 6 is secured in the reception bore 2 by means of a screw 44 that is screwed into an internal thread of the reception bore 4 and contacts the sleeve 8 on the end face side. The screw 44 is centrally recessed, so that the actuation projection 40 may be subjected by an electromagnet (not shown) to an actuation force F through the intermediary of a sphere 46. In principle, a tappet of this magnet may also act directly on the piston 14.

In the range between the stepped end face of the housing part 10 and a corresponding step of the reception bore 4, a movable seal 48 is provided which contacts the outer periphery of the compensating piston 22.

The valve seat 20 is in accordance with the detail representation X provided with a pressed portion 50, on the pressed surface of which the valve cone 16 (not shown in the detail X) is seated, and whereby the sealing property of the valve seat is improved substantially.

The valve seat diameter D formed by the pressed portion is somewhat larger than the external diameter d of the compensating piston 22. The end face 52 of the actuation projection 40 is formed with a comparatively very small size and subjected to the pressure present in the range of the tappet (not shown) of the electromagnet. This generally corresponds to the tank pressure which may amount up to 100 bar. At the two ports P, A, pressures of e.g. up to 450 bar may be present. If one now assumes that a comparatively high pressure (420 bar) is present at port A, then this pressure also acts in the spring chamber 25 via the compensating passage 28, i.e., the end face 24 having the external diameter d is subjected to this pressure in the closing direction, and an end face area of the piston 14 determined by the valve seat diameter D is subjected to this pressure in the opening direction. The external diameter d of the compensating piston 22 in the represented embodiments is selected such that the piston 14 is substantially pressure-balanced relative to port A, or at least a comparatively low force effective in the closing direction acts on the piston 14. Accordingly it is possible to use a comparatively weak spring 18 in the solution according to the invention—in the prior art described at the outset this spring had to be of a relatively strong design in order to balance the pressure forces acting in the opening direction and keep the valve tight. In the embodiment represented in the figure, the spring 18 merely has to act against the pressure force that acts on the end face 52 of the actuation projection 40.

In the case where the high pressure (420 bar) is present at the inlet port P and the pressure at port A is negligible, the piston 14 is—as a result of the area difference between the end face portions acted on in the closing direction and in the opening direction—subjected to a resulting force effective in the closing direction which is, however, low owing to a suitable design of the external diameter d of the compensating piston 22. In order to actuate the seat valve 1 it is then only necessary to apply a comparatively low actuation force F whereby the low force of the spring 18 and the pressure force effective in the closing direction must be overcome. In this case, the pressure force effective at the end face 52 of the actuation projection 40 also acts in the opening direction and supports the force to be applied by the electromagnet.

It was found that the magnet force required for opening the valve both from the closed condition (removed from the pole) and also in the switched condition (close to the pole) is substantially lower than in the conventional solutions. Thus it was possible in an exemplarily executed valve to reduce the actuation force by 33% in comparison with the conventional solution. Correspondingly the hydraulic performance of the valve of the invention may be enhanced, or the magnet force may be reduced accordingly. Assembly of the valve of the invention is particularly simple, for the radially set-back center portion 34 and the guide collar 36 of the piston 14 may very easily be inserted through the valve seat 20 into the valve bore 12.

What is disclosed is a directional control seat valve comprising a piston that is biased against a valve seat by means of a spring. The piston is associated with a compensating piston whose end face subjected to the pressure at one of the ports of the directional control valve is arranged before the valve seat when viewed in the closing direction.

The invention claimed is:

1. A directional control seat valve comprising:
a piston that is biased against a valve seat, whereby a connection between an inlet port and an outlet port may be controlled open; and
a compensation piston associated with the piston, an end face of the compensation piston that delimits a pressure chamber being subjected to a same pressure as at one of the ports,
wherein the compensation piston is arranged before the valve seat, when viewed in a closing direction, so that the end face thereof and a range of the piston seated on the valve seat are arranged on one side relative to the valve seat,
an external diameter of the end face, with which the compensating piston delimits the pressure chamber, is smaller than a valve seat diameter; and
an actuation projection being arranged on an other side of the valve seat opposite to the compensation piston, the actuation projection having an end face attached directly or indirectly to an actuator that moves the actuation projection, the end face of the actuation projection positioned being outside of the pressure chamber, and the end face of the actuation projection being sealed from the pressure at the inlet and outlet ports.

2. The directional control seat valve in accordance with claim 1, wherein the valve seat is pre-pressed, so that the valve seat diameter is smaller than a diameter of a bore forming the valve seat.

3. The directional control seat valve in accordance with claim 1, wherein the piston is formed integrally with the compensating piston.

4. The directional control seat valve in accordance with claim 1, wherein portions of the piston and of the compensating piston are penetrated by a compensating passage which opens into the end face and through which the pressure at one of the ports is conducted into the pressure chamber delimited by the end face.

5. The directional control seat valve in accordance with claim 4, wherein the piston is biased against the valve seat by means of a spring and the pressure chamber is a spring chamber for the spring.

6. The directional control seat valve in accordance with claim 1, wherein the piston includes the actuation projection that is subjected to tank pressure, and at which a tappet of an electromagnet attaches indirectly or directly.

7. The directional control seat valve in accordance with claim 1, wherein both ports open radially into a valve bore receiving the piston.

8. The directional control seat valve in accordance with claim 1, wherein a seal is arranged between the end face of the compensating piston and the valve seat.

9. The directional control seat valve in accordance with claim 1, wherein the directional control valve seat is executed as a 2/2-way directional control seat valve.

10. The directional control seat valve in accordance with claim 1, wherein a valve cone associated with the piston abuts the valve seat in an axial direction.

11. The directional control seat valve in accordance with claim 1, wherein a second end face of the piston opposite the spring contacts an O-ring.

12. The directional control seat valve in accordance with claim 10, wherein the valve cone contacts a valve seat, and the valve cone and the valve seat together define a seal.

13. The directional control seat valve in accordance with claim 1, wherein the diameter of said end face that delimits the pressure chamber is a diameter of a guided portion of the compensation piston.

* * * * *